March 23, 1965 P. DOTTER 3,174,586
BACK PEDALING BRAKE FOR COASTER HUBS
Filed May 28, 1963
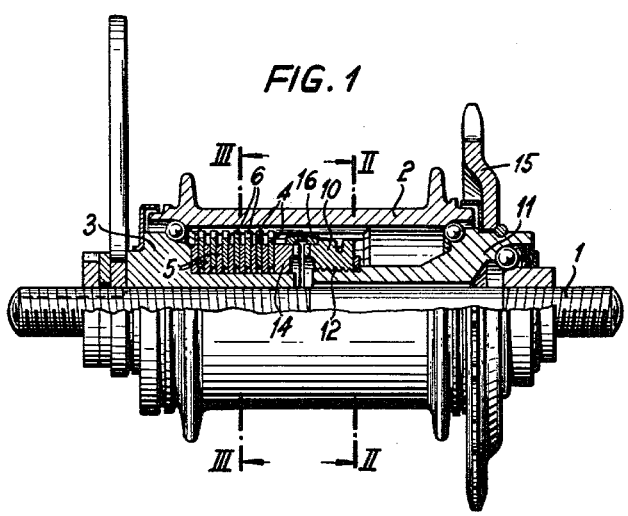
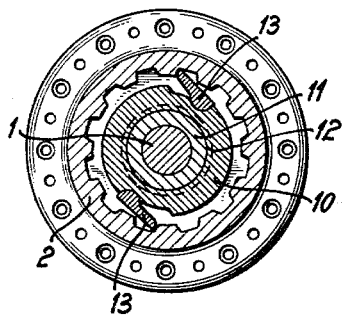
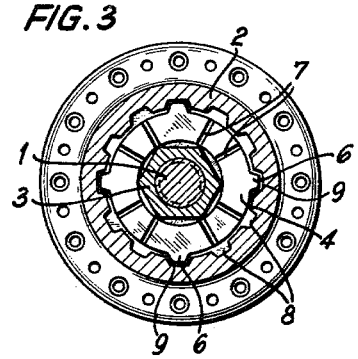
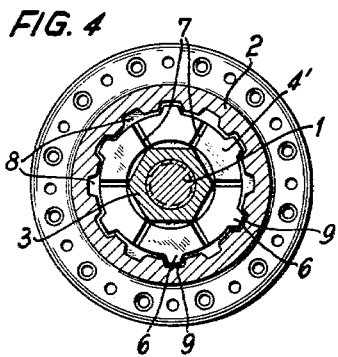
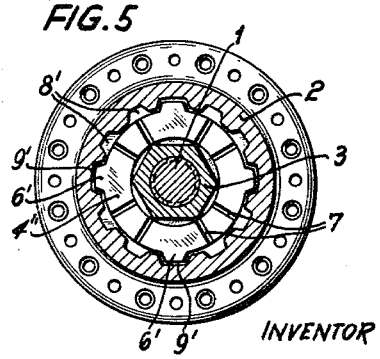
INVENTOR
Paul Dotter
By Richard Ernst
Agt

United States Patent Office 3,174,586
Patented Mar. 23, 1965

3,174,586
BACK PEDALING BRAKE FOR COASTER HUBS
Paul Dotter, Schweinfurt (Main), Germany, assignor to Fichtel & Sachs A.G., Schweinfurt (Main), Germany, a corporation of Germany
Filed May 28, 1963, Ser. No. 283,815
Claims priority, application Germany, June 1, 1962, F 36,960
12 Claims. (Cl. 188—26)

This invention relates to back pedaling brakes in coaster hubs for bicycles, motorcycles, and similar vehicles, and more particularly to multiple disk brakes.

Known multiple disk brakes for bicycle hubs have two sets of friction disks which are secured against rotation on the hub shaft and on the hub shell respectively. The disks of one set are axially interposed between axially juxtaposed disks of the other set, and the disks of both sets are axially movable so that the rotation of the hub shell about the stationary hub shaft may be braked by moving the disks toward each other in an axial direction. The brake is applied by back pedaling.

The multiple disk brakes for bicycle hubs rely on the presence of a lubricant film on the opposite friction faces of the two sets of disks for separation of the disks after braking. In the absence of an adequate lubricant film, the brake may jam.

The primary object of the invention is the provision of a multiple disk brake of the afore-described type in which maintenance of a sufficient lubricant film on the fricton faces of the brake disks is ensured.

More specifically, the invention aims at providing a reliable lubricant supply for the friction faces from the body of lubricant normally held in a bicycle hub for lubrication of ball bearings and other hub elements arranged in a portion of the hub shell cavity axially spaced from the brake disks.

Another object of the invention is the replenishment of the lubricant supply for the brake disks without disassembly of the hub, a feature not available in conventional coaster hubs equipped with multiple-disk brakes.

Yet another object of the invention is the continuous replenishment of the lubricant supply for the brake disks during normal operation of the bicycle.

With these and other objects in view, the invention modifies the known coaster hub having two sets of friction disks engaged during back pedaling, by providing the hub shell with two groups of axially elongated grooves which are circumferentially spaced about the brake disks. The driven brake disks are secured against rotation on the hub shell by lugs or similar means which radially engage the grooves of a first group, whereas the grooves of the second group are free from lugs and permit unimpeded axial flow of lubricant to the brake disks from the several spaces of the hub which normally hold lubricant.

According to another feature of the invention, friction faces of one set of brake disks are formed with recesses which are radially elongated in such a manner that they communicate with the grooves of the aforementioned second group during rotation of the hub shell about the shaft. When the recesses are in the friction faces of the driven disks fastened on the hub, they are circumferentially aligned with the grooves of the other group and permanently communicate therewith.

In order to prevent the accidental mounting of the driven brake disks in such a manner that the lugs of one or more disks enter the grooves of the second group and interfere with axial lubricant flow therein, it is preferred to give the lugs circumferential dimensions which conform to those of the grooves of the aforementioned first group, and to make the circumferential dimensions of the first group of grooves so small as to prevent insertion of the lugs.

Other features and advantages of this invention will hereinafter become more fully apparent from the following detailed description of the annexed drawings which illustrate preferred embodiments, and wherein:

FIG. 1 shows a coaster hub for a bicycle equipped with a multiple-disk brake according to the invention, the view being in side elevation, and partly in axial section;

FIG. 2 illustrates the hub of FIG. 1 in radial section on the line II—II;

FIG. 3 is a radially sectional view of the hub of FIG. 1 on the line III—III; and FIGS. 4 and 5 illustrate modifications of the hub of FIGS. 1 to 3 in views corresponding to that of FIG. 3.

Referring now to the drawing in detail, and initially to FIG. 1, there is shown a coaster hub having a stationary shaft 1 and a hub shell 2 coaxially rotatable on the shaft. A tubular member 3 is fixedly fastened on the shaft 1 and constitutes therewith a stationary support structure. The member 3 carries one of the bearings on which the shell is supported, and has an imperforate hub portion on which brake disks 5 are axially slidable, but secured against rotation.

As better seen in FIG. 3, the hub portion of the member 3 is of non-circular, that is, hexagonal cross section, and the brake disks 5 slidably receive the hub portion in conforming hexagonal central openings not explicitly shown in the drawing. The brake disks 5 are made of or coated with a material having a high coefficient of friction with respect to the driven brake disks 4 which are axially slidable, but secured against rotation relative to the hub shell 2 as will be described in more detail hereinafter.

The brake disks 5 of the stationary first set of disks axially alternate with the brake disks 4 of the driven second set so that the brake is engaged when the brake disks are subjected to axial pressure between respective radial faces of the member 3 and of a ring 14 axially slidable on the hub portion of the member 3.

The driver 11 of the hub is fixedly connected with a drive sprocket 15 and rotatably carries one axial end of the hub shell 2 as is conventional. An annular pawl carrier 10 has internal threads which engage mating external threads 12 on the driver 11. The pawl carrier is connected to the ring 14 by a friction coupling 16. As shown in FIG. 2, the pawl carrier 10 carries two spring loaded pawls 13 which drivingly engage the projections of an internal ratchet on the hub shell 2. The grooves of this ratchet extend axially from a portion of the hub shell 2 adjacent the pawls 13 in a direction away from the driver 11 to a portion of the shell adjacent the bearing supported on the member 3.

The structure described so far operates in a known manner as follows:

During normal forward pedaling, the drag of the friction coupling 16 causes the pawl carrier to rotate on the threads 12 in such a manner that the pawl carrier 10 moves axially away from the brake disks 4, 5. The ring 14 is free to follow the axial movement of the pawl carrier 10 until the latter abuts against a shoulder on the driver 11 which prevents further threaded movement. The brake is disengaged.

During backpedaling, the drag of the friction coupling 16 has the effect of moving the pawl carrier 10 on the threads 12 toward the two sets of brake disks until the axial pressure of the pawl carrier transmitted by the friction coupling 16 and the ring 14 to the brake disks 4, 5 is balanced by the resistance of the disks against further compression. The frictional engagement of the disks brakes or arrests the relative rotation of the hub shell 2 and shaft 1.

As shown in FIG. 3, there are twelve axial grooves in the inner wall of the hub shell 2 between the corresponding projections of the ratchet arrangement. Each driven brake disk 4 has four radially projecting lugs 6 angularly offset 90° from each other which engage the four grooves 9 of a first group of axially elongated grooves in the hub shell 2. The circumferential dimensions of the lugs 6 conform to those of the engaged grooves 9 so that the driven disks 4 are securely held against rotation in the shell 2.

The radial friction face of the illustrated disk 4 has eight radially elongated recesses 7 which extend from the central circular opening of the disk 4 about the hub portion of the member 3 to the outer circumference of the disk, and are angularly aligned with the eight grooves 8 of a second group of axial grooves in the hub shell 2 which are free from lugs 6. The grooves 8 and 9 are identical in cross section and spaced about the hub axis at uniform angles of 30°.

The pattern of grooves, lugs, and recesses may be varied by modifying the configuration of the brake disks, of the hub shell, or of both. In the embodiment of the invention illustrated in FIG. 4, the hub shell 2 is identical with that shown in FIG. 3, and has twelve axially elongated grooves. The driven brake disk 4' has six radial lugs 6 which engage six grooves 9 of a first group of grooves circumferentially alternating with six grooves 8 of a second group free from lugs. The disk 4' has six radially elongated recesses 7 the outer terminal portions of which are circumferentially aligned with the grooves 8.

A careless mechanic may assemble a hub of the types shown in FIGS. 3 and 4 in such a manner that the lugs 6 on the several driven brake disks 4, 4' are not properly aligned with corresponding axially elongated grooves 9, and the grooves 8 of the second group of grooves are obstructed by lugs 6. Such accidental mounting of the brake disks 4, 4' is prevented by the arrangement illustrated in FIG. 5, generally similar to that of FIG. 4, but having grooves 8' and 9' which differ in dimensions. The circumferential width of the grooves 9' and of the conforming lugs 6' on the brake disk 4'' is greater than the width of the grooves 8', and it is therefore impossible to insert the lugs 6 into grooves 8' by accident or otherwise.

The second group of unencumbered grooves 8, 8' in the several embodiments of the invention permits the axial flow of lubricant to the brake disks from spaces in the hub shell 2 which normally hold lubricant, such as the spaces about the several bearings by means of which the hub shell is supported on the member 13 and on the driver 11. The radial recesses 7 further facilitate the spreading of a lubricant film over the friction faces of the brake disks. When the axial pressure on the brake disks is relieved with the termination of back pedaling, the brake disks separate readily because of the presence of an adequate lubricant film, and jamming of the brake is avoided.

When the lubricant supply for the hub shell bearings is replenished in a conventional manner, the amount of lubricant available to the hub disks is increased at the same time. It is not necessary to make special provisions for lubricating the brake disks, an operation which may require disassembly of the hub in conventional arrangements. The manner of replenishing the lubricant for the hub bearings may be entirely conventional, and has therefore not been illustrated. It will be understood that the axially central portion of the hub shell cut away in the view of FIG. 1 and not seen in the views of FIGS. 2 to 5 may carry a capped lubricant nipple, or that other conventional arrangements may be made for supplying fresh lubricant to the bearings as needed.

Flow of lubricant from the normal lubricant holding spaces of the hub shell cavity to the friction faces of the brake disks is actuated by the centrifugal forces generated during hub rotation in the normal operation of the vehicle. Any deficiency in the lubricant film between the friction faces of the brake disks is thus automatically remedied.

It should be understood, of course, that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. In a vehicle hub, in combination:
    (a) stationary support means;
    (b) a driver member rotatable on said support means in a forward direction and a backward direction;
    (c) hub shell means rotatable relative to said support means about an axis, said support means having a non-circular face about said axis within said hub shell means;
    (d) first motion transmitting means selectively connecting said hub shell means to said driver member for joint rotation when said driver member rotates in said forward direction;
    (e) a first set of friction members formed with a non-circular opening therethrough, each opening conformingly engaging said face and receiving said support means for axial sliding movement of said friction member on said support means, whereby said first set of friction members is secured against rotation about said axis;
    (f) a second set of friction members, the friction members of said second set being axially interposed between respective pairs of friction members of said first set, each friction member having two radially extending friction faces facing in opposite axial directions, whereby each member of one set has a friction face axially opposite a friction face of a member of the other set, and constituting therewith a co-ordinated pair of friction faces;
    (g) lug means on the friction members of said second set;
    (h) a plurality of axially elongated projections on said hub shell means defining therebetween a plurality of axially elongated circumferentially spaced grooves, said lug means radially engaging at least one selected groove of said plurality of grooves for securing the friction members of said second set against rotation, while at least one other groove is free from said lug means, said lug means being axially movable in said selected groove; and
    (i) second motion transmitting means interposed between said driver member and said sets of friction members for axially moving said friction members into frictional engagement of said friction faces responsive to backward rotation of said driver member.

2. In a hub as set forth in claim 1, said face of said support means being imperforate.

3. In a vehicle hub as set forth in claim 1, said first motion transmitting means including pawl means secured on said driver member against rotation relative thereto and engageable with said groove for transmitting rotation from said driver member to said hub shell means.

4. In a brake as set forth in claim 1, one of the friction faces of each coordinated pair being formed with a radially elongated recess communicating with said other groove on said hub shell means during rotation of said hub shell means about said axis.

5. In a brake as set forth in claim 4, said radially elongated recess being formed in the friction face of a friction member of said second set, and being circumferentially aligned with said other groove.

6. In a brake as set forth in claim 5, the circumferential width of said other groove being different from the circumferential width of said one groove, said lug means having circumferential dimensions substantially conforming with the circumferential dimensions of said one groove.

7. In a brake as set forth in claim 6, the circumferential dimensions of said one groove being greater than the corresponding dimensions of said other groove.

8. In a brake as set forth in claim 1, said hub shell means defining a cavity therein, said sets of friction members being arranged in one axial portion of said cavity, another axial portion of said cavity constituting a lubricant holding space, said other groove communicating with said space.

9. In a vehicle hub, in combination:
(a) stationary support means having an axis and a non-circular face about said axis;
(b) a driver member rotatable on said support means about said axis in a forward direction and in a backward direction;
(c) a hub shell mounted on said support means for rotation about said axis;
(d) first motion transmitting means interposed between said driver member and said hub shell for selectively actuating rotation of said shell when said driver member rotates in a forward direction;
(e) a first set of friction disks formed with respective openings conforming to said face, and slidably receiving said support means in said opening in conforming engagement with said face, whereby the friction disks of said first set are axially slidable on said support means and secured against rotation about said axis;
(f) a second set of friction disks, each friction disk of said first and second sets having two radially extending friction faces facing in opposite axial directions, each disk of said second set being axially interposed between two friction disks of said first set, whereby each friction disk has a friction face axially opposite a friction face of the other set, axially opposite faces of two respective disks of said sets constituting a pair of coordinated friction faces;
(g) lug means on each friction disk of said second set, said hub shell being formed with a first group and a second group of axially elongated grooves spaced about said friction disks, said lug means selectively engaging the grooves of said first group for securing the disks of said second set against rotation relative to said hub shell while permitting axial displacement of the friction disks of said second set; and
(h) second motion transmitting means interposed between said driver member and said sets of friction disks for axially moving said friction disks toward each other for frictional engagement of the coordinated friction faces when said driver member rotates in said backward direction.

10. In a vehicle hub as set forth in claim 9, in said first motion transmitting means including pawl means secured on said driver member against rotation relative thereto and engageable with said groove for transmitting rotation from said driver member to said hub shell means.

11. In a hub as set forth in claim 9, said hub shell defining a cavity therein, said sets of friction disks being arranged for axial movement in one axial portion of said cavity, another axial portion of said cavity constituting a lubricant holding space, said second group of grooves communicating with said other cavity portion.

12. In a hub as set forth in claim 11, said friction faces of the friction disks of said second set being formed with a plurality of radially elongated recesses having terminal portions circumferentially aligned with respective grooves of said second group and communicating therewith.

References Cited by the Examiner
UNITED STATES PATENTS

| | | |
|---|---|---|
| 1,189,176 | 6/16 | Price. |
| 1,702,116 | 2/29 | Hoffman _____ 192—113 |
| 1,843,987 | 2/32 | Ragan _____ 192—113 |
| 2,054,583 | 9/36 | Crow _____ 188—26 X |
| 3,025,686 | 3/62 | Lewis. |

ARTHUR L. LA POINT, *Primary Examiner.*

DUANE A. REGER, *Examiner.*